United States Patent
Bulluck et al.

(10) Patent No.: US 6,818,692 B2
(45) Date of Patent: Nov. 16, 2004

(54) HIGH STRENGTH NON HAZARDOUS AIR POLLUTANT RUBBER CEMENT COMPOSITION

(75) Inventors: John W. Bulluck, Spicewood, TX (US); Holly McKee, Austin, TX (US)

(73) Assignee: W. W. Henry Company, Aliquippa, PA (US)

( * ) Notice: Subject to any disclaimer, the term of this patent is extended or adjusted under 35 U.S.C. 154(b) by 0 days.

(21) Appl. No.: 10/234,439

(22) Filed: Sep. 4, 2002

(65) Prior Publication Data

US 2003/0119964 A1 Jun. 26, 2003

Related U.S. Application Data

(60) Provisional application No. 60/317,085, filed on Sep. 4, 2001.

(51) Int. Cl.$^7$ ................................................. C08K 3/18
(52) U.S. Cl. ..................... 524/432; 524/433; 524/552; 524/565; 524/551; 524/571; 524/577; 524/576
(58) Field of Search ................................ 524/432, 433, 524/552, 565, 551, 571, 577, 576

(56) References Cited

U.S. PATENT DOCUMENTS

| | | | | |
|---|---|---|---|---|
| 3,391,100 A | * | 7/1968 | Mitchell | |
| 3,933,719 A | * | 1/1976 | Iwai et al. | 524/258 |
| 4,130,528 A | | 12/1978 | Chen | 260/29.7 |
| 4,212,780 A | | 7/1980 | Fitzgerald | 260/27 BB |
| 4,358,489 A | * | 11/1982 | Green | 428/31 |
| 4,418,123 A | | 11/1983 | Bunnelle et al. | 428/517 |
| 4,463,114 A | | 7/1984 | Perlinski et al. | 523/409 |
| 4,497,926 A | | 2/1985 | Toy | 524/271 |
| 4,556,464 A | | 12/1985 | St. Clair | 204/159.15 |
| 4,616,048 A | | 10/1986 | De Trano et al. | 523/166 |
| 4,622,357 A | | 11/1986 | Tsuchida et al. | 524/270 |
| 4,640,730 A | | 2/1987 | Streets et al. | 156/334 |
| 4,714,749 A | | 12/1987 | Hughes et al. | 526/290 |
| 4,717,749 A | | 1/1988 | Tang et al. | 524/271 |
| 4,792,584 A | | 12/1988 | Shiraki et al. | 524/77 |
| 5,093,203 A | | 3/1992 | Mowrey et al. | 428/462 |
| 5,149,732 A | | 9/1992 | Igarashi et al. | 524/315 |
| 5,346,957 A | | 9/1994 | Tsuji et al. | 525/122 |
| 5,367,010 A | | 11/1994 | Gervase et al. | 524/260 |
| 5,407,993 A | | 4/1995 | Lyons et al. | 524/501 |
| 5,409,987 A | | 4/1995 | Kalwara et al. | 524/519 |
| 5,444,112 A | | 8/1995 | Carnahan | 524/272 |
| 5,453,319 A | | 9/1995 | Gobran | 428/355 |
| 5,476,896 A | | 12/1995 | Pereira et al. | 524/524 |
| 5,534,583 A | | 7/1996 | Roberts et al. | 524/476 |
| 5,688,856 A | | 11/1997 | Austgen, Jr. et al. | 524/505 |
| 5,750,623 A | | 5/1998 | Diehl et al. | 525/98 |
| 5,773,506 A | | 6/1998 | Nestegard et al. | 524/505 |
| 5,827,528 A | | 10/1998 | Kubo et al. | 424/443 |
| 5,932,648 A | | 8/1999 | Troska et al. | 524/505 |
| 6,046,260 A | | 4/2000 | Hoover | 524/71 |
| 6,048,471 A | | 4/2000 | Henry | 252/364 |
| 6,077,896 A | | 6/2000 | Yano et al. | 524/308 |
| 6,086,997 A | | 7/2000 | Patel et al. | 428/355 BL |
| 6,087,421 A | | 7/2000 | Patel et al. | 524/113 |
| 6,103,792 A | | 8/2000 | Hoover et al. | 524/47 |
| 6,106,941 A | | 8/2000 | Fisher et al. | 428/355 EN |
| 6,187,850 B1 | | 2/2001 | Kawamura et al. | 524/425 |
| 6,225,408 B1 | | 5/2001 | Huang et al. | 525/88 |
| 6,232,391 B1 | | 5/2001 | Sambasivam et al. | 524/505 |
| 6,306,943 B1 | | 10/2001 | Henry | 524/270 |
| 6,379,791 B1 | | 4/2002 | Cernohous et al. | 428/355 |
| 6,433,069 B1 | | 8/2002 | Oeltjen et al. | 524/505 |
| 6,469,082 B1 | | 10/2002 | Raymond et al. | 524/273 |

FOREIGN PATENT DOCUMENTS

| | | | | |
|---|---|---|---|---|
| JP | 63039938 A | | 8/1986 | |
| JP | 63039938 A | * | 2/1988 | C08L/21/00 |

* cited by examiner

Primary Examiner—William K. Cheung
(74) Attorney, Agent, or Firm—O'Keefe, Egan & Peterman, LLP

(57) ABSTRACT

This invention pertains to rubber cement compositions containing a rubber elastomer, a tackifier, and an organic solvent that is not a hazardous air pollutant (HAP). This invention also includes the method of making this rubber cement composition and of using this adhesive to bond to surfaces together.

25 Claims, No Drawings

HIGH STRENGTH NON HAZARDOUS AIR POLLUTANT RUBBER CEMENT COMPOSITION

This application claims priority to U.S. provisional patent application Ser. No. 60/317,085, filed Sep. 4, 2001, incorporated herein by reference.

Subject to right of the assignee afforded under a Small Business Innovation Research (SBIR) program, the U.S. government has paid-up license in this invention and the right in limited circumstances to require the patent owner to license others on reasonable terms as provided for the terms of contract number N00421-00-C-0193, which was supported by the Naval Air War Center.

This invention pertains to rubber cement formulations. More particularly, this invention pertains to adhesives containing a rubber elastomer, a tackifier, and an organic solvent that is not a hazardous air pollutant (HAP).

The current, commercial adhesive products contain large amounts of hazardous air pollutants (HAP's) solvents, including methyl ethyl ketone (MEK), toluene, xylene, tetrachloroethylene, perchloroethylene (PERC) and methyl isobutyl ketone (MIBK). Hazardous air pollutants are those substances that may cause immediate or long-term adverse effects on human health such as cancer and are listed on the United States Environmental Protection Agency's list of HAPs. The adhesive industry has been desirous of fast drying new non-HAP containing rubber cement formulations with excellent adhesion to cellular insulation both nitrile and polyethylene.

Thus, there is a need for a new adhesive that meets these demands.

SUMMARY OF INVENTION

Our invention is a non-HAP containing rubber cement that affords excellent adhesion, safety, application speed, and ultimately good overall performance and cost reduction. This invention relates to low viscosity HAP-free contact adhesive compositions that have good adhesion to a variety of substrates. More particularly this invention relates to the use, for example, of polychloroprene elastomers, nitrile elastomers, and styrene-butadiene elastomers in combination with phenolic tackifiers in adhesive formulations to achieve HAP-free, high strength, commercial adhesive formulations. For instance, these rubber cements are used for the bonding of cellular insulation to itself, tile to concrete, metal to metal, canvas-to-canvas, and rubber-to-rubber, as well as combinations of these adherends. The rubber cements of this invention can achieve environmental compliance with the United States Clean Air Amendment, 1990, Sect. 112, HAPs and United States President Clinton's Executive Order 12856. The non-HAP containing rubber cements of this invention dry quickly yet provide equal or better adhesion than the historic HAP containing rubber cements when bonding cellular insulation, tile, canvas, aluminum, polychloroprene and polyvinyl chloride calendered fabrics.

Rubber cements have used for bonding a wide variety of adherends since the 1960's. However, dangerous solvents such as methyl ethyl ketone, xylene, toluene, dichlorobenzene, have been historically used in these products. The new adhesive of this invention will provide strong durable bonds for the tile, cellular insulation, and other applications and provide greater personal safety for the employees. The new rubber cements of this invention provide faster and easier application, in addition to quick application time that will reduce maintenance costs. Costs associated with environmentally unacceptable adhesive ingredients can be eliminated. Also, if desired subsequent removal of the adhesive can be accomplished by an environmentally acceptable solvent, eliminating HAP solvent use at all levels.

In one respect, this invention is a rubber cement composition, comprising a non-HAP aprotic, non-aromatic solvent; a tackifier; and an elastomer. This composition may also include magnesium oxide and/or zinc oxide. It should be understood that this composition is formulated from these components, and components such as the magnesium oxide may react with water and/or the elastomer, for instance, thereby reducing the amount present. As such, it should be understood that the composition may alternatively be referred to as having been formulated from components which comprise a non-HAP aprotic, non-aromatic solvent, a tackifier, and an elastomer, optionally including a metal oxide such as magnesium oxide and zinc oxide, and optionally including a small amount of water if magnesium oxide were included.

In another respect, this invention is a process for manufacturing a rubber cement composition, comprising: dissolving a tackifier and an elastomer in an aprotic non-aromatic non-HAP organic solvent.

In another respect, this invention is a process for adhering a first substrate to a second substrate, comprising: applying a rubber cement composition to a surface of the first substrate, applying the rubber cement composition to a surface of the second substrate, and pressing together the surfaces having the rubber cement composition applied thereon of the first and second substrates to thereby adhere the first and second substrates to each other.

DETAILED DESCRIPTION OF THE INVENTION

Rubber cements are a class of adhesives that may be applied to both adherends, the solvent is allowed to evaporate (dry to the touch) and the surfaces are mated together under slight pressure. This results in a very strong and long lasting adhesive bond. Sometimes the adhesive strength of the bond exceeds the cohesive strength of the adherends. However dangerous solvents such as methyl ethyl ketone, xylene, toluene, dichlorobenzene, have been historically used in these products. The dilemma addressed by this invention is to solubilize all the components in the rubber cements with only non-HAP solvents, the solvent preferably flashes off as quickly as the previous products, and the bonds are preferably as strong or stronger than the HAP solvent containing adhesives. This invention affords a solution to this problem by providing a non-HAP solvent containing contact adhesive (rubber cement) formulations that exhibit excellent adhesion to a variety of substrates.

The elastomers (rubber adhesives) that may be used in the practice of this invention vary widely. In general, the elastomers are suitable for use in forming rubber cement contact adhesives, as are well known to one of skill in the are based on viscosity, elasticity, adhesion, end use, and compatibility with other components of the formulation. These elastomers are typically made synthetically and are generally available commercially. Natural rubbers may also be used in the practice of this invention.

Representative, non-limiting examples of elastomers that may be employed in the practice of this invention include polychloroprenes (often referred to as neoprenes), epichlorohydrin elastomers, chlorinated polyethylene, chlorosulfonated polyethylene, propylene oxide elastomers, nitrile elastomers such as acrylonitrile-butadiene copolymers, acrylic elastomers such as butyl acrylate homopolymers and copolymers, styrene-butadiene-styrene copolymers, styrene-isoprene-styrene copolymers, and mixtures thereof. The polychloroprenes can include copolymers such as chloroprene/methacrylic acid copolymers that are non-phasing, non-crystallizing polymers as well as carboxylated chloroprene polymers.

Styrenic Block Copolymers (SBC) is a family of polymers that has a polystyrene (S) block on one end or on both ends of a rubber block. The rubber block is usually polybutadiene (B), polyisoprene (I), hydrogenated polybutadiene (EB) or hydrogenated polyisoprene (EP). SBCs have a long history of use in adhesives and sealants. When a formulating ingredient such as a resin or plasticizer is added to an SBC, its effect on the mixture is determined by its compatibility characteristics. If it is an aliphatic resin or plasticizer, it will be more compatible thermodynamically with the rubber midblock phase and will increase the fraction of the soft, rubbery phase. Therefore, midblock resins and plasticizers make the adhesive or sealant softer and modify the glass transition temperature (Tg) of the rubbery midblock phase. If the resin or plasticizer is aromatic or slightly polar, it will be more compatible with the polystyrene endblocks. Therefore, endblock resins increase the fraction of the hard, endblock phase, increase the hardness of the sealant and modify the Tg of the endblock phase. Endblock plasticizers reduce the Tg of the endblock phase and reduce the maximum temperature at which the sealant can be used. If the resin or plasticizer is quite polar or is of high molecular weight, it will not be compatible with either phase of the SBC and will form its own separate third phase.

The hardness of the adhesive will be determined primarily by the relative fraction of hard phase versus soft phase where the hard phase is the endblock phase (the polystyrene endblocks plus endblock resin) and the soft phase is the midblock phase (the rubber midblock, midblock resin and midblock plasticizer). The temperature at which the adhesive becomes brittle will be determined primarily by the Tg of the rubbery midblock phase.

Generally, the amount of elastomers employed in the formulations of this invention is greater than about 5 percent based on the total weight of the formulation. Generally, the amount of elastomers is less than about 50 percent. In one embodiment, the amount of elastomers is less than about 30 percent. In one embodiment, for styrenic block copolymers ("SBC" such as styrene butadiene rubbers or "SBR") based formulations, the elastomer is preferably employed in an amount of from about 10 to about 30 percent, more preferably from about 13 to about 27 percent. In one embodiment, for polychloroprene (neoprene) based formulations, the elastomer is preferably employed in an amount of from about 5 to about 20 percent, more preferably from about 9 to about 18 percent. In one embodiment, for nitrile elastomer based formulations, the elastomer is preferably employed in an amount of from about 5 to about 30 percent, more preferably from about 8 to about 23 percent.

The tackifiers (which may also be referred to as tackifying agents) that may be used in the formulations of this invention include a wide variety of materials, including commercially available tackifiers. Representative, non-limiting examples of tackifiers that may be used in the practice of this invention include rosin, hydrocarbon resins, polymerized petroleum hydrocarbons, polyterpenes, phenolic resins, terpene phenolic resins, coumarone-indene resin, and mixtures thereof. In one embodiment, the tackifier is a tertiary butyl phenolic formaldehyde type resin (Ribetak 7522 resin).

Generally, the amount of tackifier is greater than about 2 percent of the formulation and is commonly about 5 percent or more. Generally the amount of tackifier is less than about 30 percent. In one embodiment, the amount of tackifier is greater than about 8 percent. In one embodiment, the amount of tackifier is less than about 26 percent. In one embodiment, for SBC based formulations, the tackifier is preferably employed in an amount of from about 10 to about 30 percent, more preferably from about 10 to about 26 percent. In one embodiment, for polychloroprene (neoprene) based formulations, the tackifier is preferably employed in an amount of from about 5 to about 30 percent, more preferably from about 8 to about 23 percent. In one embodiment, for nitrile elastomer based formulations, the tackifier is preferably employed in an amount of from about 5 to about 30 percent, more preferably from about 8 to about 23 percent.

The solvents employed in the practice of this invention are HAP compliant. That is, the solvents are not considered to be HAP solvents. The current list of HAP solvents that are not to be employed in the practice of this invention are:

| Chemical Abstracts Service Number | Pollutant |
| --- | --- |
| 75-07-0 | Acetaldehyde |
| 60-35-5 | Acetamide |
| 75-05-8 | Acetonitrile |
| 98-86-2 | Acetophenone |
| 53-96-3 | 2-Acetylaminofluorene |
| 107-02-8 | Acrolein |
| 79-06-1 | Acrylamide |
| 79-10-7 | Acrylic acid |
| 107-13-1 | Acrylonitrile |
| 107-05-1 | Allyl chloride |
| 92-67-1 | 4-Aminobiphenyl |
| 62-53-3 | Aniline |
| 90-04-0 | o-Anisidine |
| 1332-21-4 | Asbestos |
| 71-43-2 | Benzene (including benzene from gasoline) |
| 92-87-5 | Benzidine |
| 98-07-7 | Benzotrichloride |
| 100-44-7 | Benzyl chloride |
| 92-52-4 | Biphenyl |
| 117-81-7 | Bis(2-ethylhexyl)phthalate (DEHP) |
| 542-88-1 | Bis(chloromethyl) ether |
| 75-25-2 | Bromoform |
| 106-99-0 | 1,3-Butadiene |
| 156-62-7 | Calcium cyanamide |
| 133-06-2 | Captan |
| 63-25-2 | Carbaryl |
| 75-15-0 | Carbon disulfide |
| 56-23-5 | Carbon tetrachloride |
| 463-58-1 | Carbonyl sulfide |
| 120-80-9 | Catechol |
| 133-90-4 | Chloramben |
| 57-74-9 | Chlordane |
| 7782-50-5 | Chlorine |
| 79-11-8 | Chloroacetic acid |
| 532-27-4 | 2-Chloroacetophenone |
| 108-90-7 | Chlorobenzene |
| 510-15-6 | Chlorobenzilate |
| 67-66-3 | Chloroform |
| 107-30-2 | Chloromethyl methyl ether |
| 126-99-8 | Chloroprene |
| 1319-77-3 | Cresol/Cresylic acid (mixed isomers) |
| 95-48-7 | o-Cresol |
| 108-39-4 | m-Cresol |
| 106-44-5 | p-Cresol |
| 98-82-8 | Cumene |
| N/A | 2,4-D (2,4-Dichlorophenoxyacetic Acid) (including salts and esters) |
| 72-55-9 | DDE (1,1-dichloro-2,2-bis(p-chlorophenyl)ethylene) |
| 334-88-3 | Diazomethane |

-continued

| Chemical Abstracts Service Number | Pollutant |
|---|---|
| 132-64-9 | Dibenzofuran |
| 96-12-8 | 1,2-Dibromo-3-chloropropane |
| 84-74-2 | Dibutyl phthalate |
| 106-46-7 | 1,4-Dichlorobenzene |
| 91-94-1 | 3,3'-Dichlorobenzidine |
| 111-44-4 | Dichloroethyl ether (Bis[2-chloroethyl]ether) |
| 542-75-6 | 1,3-Dichloropropene |
| 62-73-7 | Dichlorvos |
| 111-42-2 | Diethanolamine |
| 64-67-5 | Diethyl sulfate |
| 119-90-4 | 3,3'-Dimethoxybenzidine |
| 60-11-7 | 4-Dimethylaminoazobenzene |
| 121-69-7 | N,N-Dimethylaniline |
| 119-93-7 | 3,3'-Dimethylbenzidine |
| 79-44-7 | Dimethylcarbamoyl chloride |
| 68-12-2 | N,N-Dimethylformamide |
| 57-14-7 | 1,1-Dimethylhydrazine |
| 131-11-3 | Dimethyl phthalate |
| 77-78-1 | Dimethyl sulfate |
| N/A | 4,6-Dinitro-o-cresol (including salts) |
| 51-28-5 | 2,4-Dinitrophenol |
| 121-14-2 | 2,4-Dinitrotoluene |
| 123-91-1 | 1,4-Dioxane (1,4-Diethyleneoxide) |
| 122-66-7 | 1,2-Diphenylhydrazine |
| 106-89-8 | Epichlorohydrin (1-Chloro-2,3-epoxypropane) |
| 106-88-7 | 1,2-Epoxybutane |
| 140-88-5 | Ethyl acrylate |
| 100-41-4 | Ethylbenzene |
| 51-79-6 | Ethyl carbamate (Urethane) |
| 75-00-3 | Ethyl chloride (Chloroethane) |
| 106-93-4 | Ethylene dibromide (Dibromoethane) |
| 107-06-2 | Ethylene dichloride (1,2-Dichloroethane) |
| 107-21-1 | Ethylene glycol |
| 151-56-4 | Ethyleneimine (Aziridine) |
| 75-21-8 | Ethylene oxide |
| 96-45-7 | Ethylene thiourea |
| 75-34-3 | Ethylidene dichloride (1,1-Dichloroethane) |
| 50-00-0 | Formaldehyde |
| 76-44-8 | Heptachlor |
| 118-74-1 | Hexachlorobenzene |
| 87-68-3 | Hexachlorobutadiene |
| N/A | 1,2,3,4,5,6-Hexachlorocyclohexane (all stereo isomers, including indane) |
| 77-47-4 | Hexachlorocyclopentadiene |
| 67-72-1 | Hexachloroethane |
| 822-06-0 | Hexamethylene diisocyanate |
| 680-31-9 | Hexamethylphosphoramide |
| 110-54-3 | Hexane |
| 302-01-2 | Hydrazine |
| 7647-01-0 | Hydrochloric acid (Hydrogen Chloride) |
| 7664-39-3 | Hydrogen fluoride (Hydrofluoric acid) |
| 123-31-9 | Hydroquinone |
| 78-59-1 | Isophorone |
| 108-31-6 | Maleic anhydride |
| 67-56-1 | Methanol |
| 72-43-5 | Methoxychlor |
| 74-83-9 | Methyl bromide (Bromomethane) |
| 74-87-3 | Methyl chloride (Chloromethane) |
| 71-55-6 | Methyl chloroform (1,1,1-Trichloroethane) |
| 78-93-3 | Methyl ethyl ketone (2-Butanone) |
| 60-34-4 | Methylhydrazine |
| 74-88-4 | Methyl iodide (Iodomethane) |
| 108-10-1 | Methyl isobutyl ketone (Hexone) |
| 624-83-9 | Methyl isocyanate |
| 80-62-6 | Methyl methacrylate |
| 1634-04-4 | Methyl tert-butyl ether |
| 101-14-4 | 4,4'-Methylenebis(2-chloroaniline) |
| 75-09-2 | Methylene chloride (Dichloromethane) |
| 101-68-8 | 4,4'-Methylenediphenyl diisocyanate (MDI) |
| 101-77-9 | 4,4'-Methylenedianiline |
| 91-20-3 | Naphthalene |
| 98-95-3 | Nitrobenzene |
| 92-93-3 | 4-Nitrobiphenyl |
| 100-02-7 | 4-Nitrophenol |
| 79-46-9 | 2-Nitropropane |

-continued

| Chemical Abstracts Service Number | Pollutant |
|---|---|
| 684-93-5 | N-Nitroso-N-methylurea |
| 62-75-9 | N-Nitrosodimethylamine |
| 59-89-2 | N-Nitrosomorpholine |
| 56-38-2 | Parathion |
| 82-68-8 | Pentachloronitrobenzene (Quintobenzene) |
| 87-86-5 | Pentachlorophenol |
| 108-95-2 | Phenol |
| 106-50-3 | p-Phenylenediamine |
| 75-44-5 | Phosgene |
| 7803-51-2 | Phosphine |
| 7723-14-0 | Phosphorus |
| 85-44-9 | Phthalic anhydride |
| 1336-36-3 | Polychlorinated biphenyls (Aroclors) |
| 1120-71-4 | 1,3-Propane sultone |
| 57-57-8 | beta-Propiolactone |
| 123-38-6 | Propionaldehyde |
| 114-26-1 | Propoxur (Baygon) |
| 78-87-5 | Propylene dichloride (1,2-Dichloropropane) |
| 75-56-9 | Propylene oxide |
| 75-55-8 | 1,2-Propylenimine (2-Methylaziridine) |
| 91-22-5 | Quinoline |
| 106-51-4 | Quinone (p-Benzoquinone) |
| 100-42-5 | Styrene |
| 96-09-3 | Styrene oxide |
| 1746-01-6 | 2,3,7,8-Tetrachlorodibenzo-p-dioxin |
| 79-34-5 | 1,1,2,2-Tetrachloroethane |
| 127-18-4 | Tetrachloroethylene(Perchloroethylene) |
| 7550-45-0 | Titanium tetrachloride |
| 108-88-3 | Toluene |
| 95-80-7 | Toluene-2,4-diamine |
| 584-84-9 | 2,4-Toluene diisocyanate |
| 95-53-4 | o-Toluidine |
| 8001-35-2 | Toxaphene (chlorinated camphene) |
| 120-82-1 | 1,2,4-Trichlorobenzene |
| 79-00-5 | 1,1,2-Trichloroethane |
| 79-01-6 | Trichloroethylene |
| 95-95-4 | 2,4,5-Trichlorophenol |
| 88-06-2 | 2,4,6-Trichlorophenol |
| 121-44-8 | Triethylamine |
| 1582-09-8 | Trifluralin |
| 540-84-1 | 2,2,4-Trimethylpentane |
| 108-05-4 | Vinyl acetate |
| 593-60-2 | Vinyl bromide |
| 75-01-4 | Vinyl chloride |
| 75-35-4 | Vinylidene chloride (1,1-Dichloroethylene) |
| 1330-20-7 | Xylenes (mixed isomers) |
| 95-47-6 | o-Xylene |
| 108-38-3 | m-Xylene |
| 106-42-3 | p-Xylene |

In one embodiment, the organic solvents employed in the practice of this invention are aprotic. In one embodiment of this invention, the solvents of this invention do not contain aromatic functionality. It is desirable that the solvents have relatively low boiling points (e.g., less than about 100° C.) so that the solvent evaporates quickly when the adhesive is being used. Representative, non-limiting examples of non-HAP solvents that can be employed in the practice of this invention include: aliphatic ketones other than MEK such as methyl propyl ketone (MPK) and acetone, alkyl acetates such as methyl acetate, ethyl acetate, propyl acetate, and n-butyl acetate, and t-butyl acetate, alkanes other than hexane such as heptane, octane, nonane, decane, and higher alkanes which can be branched, cyclic, or straight chain, ethers such as ethyl ether and methyl ethyl ether, and halogenated hydrocarbons such as n-propyl bromide. In general, the solvents have from 4 to 20 carbon.

Generally, the amount of the solvent is greater than about 10 percent of the formulation. Generally, the amount of the solvent is less than about 90 percent. In one embodiment, the amount of the solvent is greater than about 25 percent. In one embodiment, the amount of the solvent is less than about 80 percent. In one embodiment, for SBR based formulations, the solvent is preferably employed in an amount of from about 40 to about 80 percent. In one embodiment, for polychloroprene (neoprene) based formulations, the solvent is preferably employed in an amount of from about 10 to about 90 percent, more preferably from about 40 to about 90 percent, and in one embodiment is from about 50 to about 75 percent. In one embodiment, for nitrile elastomer based formulations, the solvent is preferably employed in an amount of from about 40 to about 80 percent.

In addition, the rubber cement formulation may also include a metal oxide. Representative, non-limiting examples of such metal oxides include magnesium oxide, zinc oxide, and mixtures thereof. Both the zinc oxide and magnesium oxide serve to assist in any crosslinking that may occur and also to serve as a scavenger for chlorines that may come off of elastomers that contain chlorine thereby increasing the shelf-life of the formulation. If the elastomer has free carboxyl groups, the magnesium reacts to form a crosslinked gel having —COOMgOCO—linkages. Water and magnesium oxide may be employed to react with this gel to thereby form elastomers with —COOMgOH groups, thereby improving the solubility of the elastomer. If magnesium oxide is employed, then water may be added to convert the magnesium oxide to magnesium hydroxide in situ. In general the amount of water added comprises no greater than about 2 percent of the formulation and in one embodiment is less than about 1 percent. As used herein, it should be appreciated that a composition described provides for the amount of components added, and the amounts may decrease owing to reaction of the MgO and water, for example. The magnesium oxide, if used, is typically added in an amount up to about 2 percent. The zinc oxide, if used, is typically added in an amount up to about 2 percent. When added, the total amount of metal oxide employed can be up to about 4 percent. After reaction with the magnesium oxide, the amount of water in the formulation is reduced. These reaction products of the magnesium oxide may be referred to as derivatives of the magnesium oxide. In the practice of this invention, water is excluded if magnesium oxide is not added to the formulation. In this regard, the formulation is essentially free of water with no water added and any water present being residual water in very minor amounts in the components of the formulation. By essentially free it is meant that the formulation contains no more than 0.1 percent of water in the formulation, and generally less than 0.01 percent.

The compositions of this invention may also include a variety of other optional components. For example, the compositions may include antioxidants, colorants, plasticizers, fillers, flame retardants, processing aids, and the like.

The compositions of this invention may be made using conventional equipment and techniques. For example, the compositions can be prepared in a high shear mixer such as a two-roll mill, a Sigma mixer, a ball mill, an attritor, a high speed dispenser, a twin-screw extruder of the type suitable for use with elastomers, and so on. One method for manufacturing the adhesives of this invention would including the following steps: (1) dissolving the tackifier in solvent, (2) mixing in and dissolving the elastomer. If the elastomer is a polychloroprene, or is a chlorine-containing polymer, magnesium oxide, a small amount of water, and zinc oxide can be added prior to addition of the elastomer. In this regard, the process steps may include: (1) dissolving the tackifier in solvent; (2) admixing in magnesium oxide into the solvent/tackifier solution; (3) admixing a small amount of water to react with the magnesium oxide to form magnesium hydroxide; (4) admixing zinc oxide; (5) admixing the elastomer until the elastomer is dissolved.

Rapid bond strength coupled with high ultimate strength typifies polychloroprene contact adhesives. The adhesive grades of polychloroprene are useful for quick setting and high strength adhesives. Acrylonitrile butadiene rubber cements have been secondarily used in this invention. The two-roll mill is used in rubber cement manufacture and custom rubber or elastomer formulation development. A mixture of the neoprene, magnesium oxide, zinc oxide, and antioxidants can be milled. Milling achieves good dispersion of the fillers and a breakdown of the molecular weight of the polychloroprene or nitrile rubber that aids in salvation. Milling is vital to produce smooth solutions and to speed solution. Cold milling is desirable to minimize heat history and maximize shearing action. Neoprene AF requires approximately a five-minute breakdown period on the cold two-roll mill. An attritor was used to increase the rate of dissolution of the polychloroprene and nitrile rubbers in the candidate solvents. In general, an attritor is a device that produces fine and homogenous dispersions quickly and repeatedly under controlled conditions, and is frequently used for the manufacture of ceramics, inks, paints, coatings, metal oxides, ferrites, chocolates, chemicals, and pharmaceuticals.

The following examples illustrate the instant invention but are not intended to limit the scope of the invention or claims thereof. Unless indicated otherwise, all percentage are by weight. The formulations in the examples below have excellent adhesion to a variety of substrates and are free of hazardous air pollutants.

TABLE 1

Representative formulations of the invention

|  | Weight Percentage |
|---|---|
| Formulation 1 | |
| Neoprene AF | 15.34 |
| MPK | 75 |
| Ribetak 12603 | 7.67 |
| Water | 0.15 |
| ZnO | 0.6 |
| MgO | 1.23 |
| Formulation 2 | |
| Neoprene AF | 15.34 |
| MPK | 75 |
| Tamanol 803L | 7.67 |
| Water | 0.15 |
| ZnO | 0.6 |
| MgO | 1.23 |
| Formulation 3 | |
| Neoprene AF | 15.34 |
| MPK | 75 |
| Durez 29440 | 7.67 |
| Water | 0.15 |
| ZnO | 0.6 |
| MgO | 1.23 |
| Formulation 4 | |
| Neoprene AF | 15.34 |
| MPK | 75 |
| HRJ-2335 | 7.67 |
| Water | 0.15 |
| ZnO | 0.6 |
| MgO | 1.23 |

TABLE 1-continued

Representative formulations of the invention

| | Weight Percentage |
|---|---|
| Formulation 5 | |
| Neoprene AC | 15.34 |
| MPK | 75 |
| Tamanol 803L | 7.67 |
| Water | 0.15 |
| ZnO | 0.6 |
| MgO | 1.23 |
| Formulation 6 | |
| Neoprene AF | 15.30 |
| MPK | 75.0 |
| Water | 0.2 |
| HRJ-2355 | 7.7 |
| ZnO | 0.6 |
| MgO | 1.2 |
| Formulation 7 | |
| Neoprene AC | 15.34 |
| MPK | 75.01 |
| Tamanol 803L | 7.67 |
| Water | 0.15 |
| ZnO | 0.6 |
| MgO | 1.23 |

These formulation advantageously have solids and viscosity measurements that match commercial HAP contact adhesive products. It should be appreciated that the formulas show the amount of water and MgO added, which may react and thus decrease; hence, the formulas show the amounts of that admixed in forming the rubber cement compositions (the rubber cement compositions are formulated from these amounts of components). For our invention we prepared test specimens of canvas (duck cloth) bonded to itself and aluminum as well as polychloroprene calendered on duck cloth to evaluate the adhesion of the candidate rubber cement formulations. One of the screening tests we have using on all the candidate formulations involves the adhesion to polyethylene and or nitrile insulation. This insulation is typically used on air conditioning lines to minimize thermal losses. The new rubber cements of this invention have exhibited excellent adhesion to both foams.

In the effort to further develop the polychloroprene formulations we examined new phenolic tackifiers, non-HAP solvents, further examination of the Neoprene AC and Neoprene AF. We incorporated magnesium oxide into the formulations to improve the long-term shelf life of the rubber cements. The non-HAP solvents used in this invention include solvents that are considered non-HAP under existing regulations. Representative examples of the non-HAP solvents include but are not limited to ketones, esters, ethers, hydrocarbons, and halogenated hydrocarbons such as methyl propyl ketone, ethyl acetate, n-heptane, n-propyl bromide, n-butyl acetate. We have developed the formulations using Neoprene AC (fast crystallizing polychloroprene) and Neoprene AF (carboxyl containing polychloroprene), in addition to secondarily acrylonitrile butadiene rubbers. The amounts of the various components of the rubber cement composition may vary depending on the component, and depending on the other components in a given composition.

The formulations were prepared using the following steps.

1. Dispense solvent into container.
2. Phenolic resin is dissolved in the solvent.
3. Water is added to the formulation.
4. Magnesium oxide is added and allowed to react for 15 minutes.
5. Zinc Oxide is added to the formulation.
6. Polychloroprene is added to the formulation.
7. Formulation is processed in the attritor for two to three hours or until completely dissolved.

Below are some formulations that exhibited cohesive foam tear in testing. In the tables, "MPK" refers to methyl propyl ketone; Ribetak R7522, Ribetak 12603, Tamanol 803L, Durez 29440, and HRJ-2335 are all phenolic resin tackifiers. A mixture experimental design was conducted to examine the relationship between the formulation components and its effect on adhesion and viscosity.

| Formulation | Neoprene AF Wt. % | MPK Wt. % | Ribetak R7522 Wt. % | ZnO Wt. % | MgO Wt. % | Water Wt. % |
|---|---|---|---|---|---|---|
| 8 | 13.08 | 77.5 | 7.69 | .58 | 1.08 | 0.07 |
| 9 | 17 | 70.75 | 10 | 0.75 | 1.4 | 0.1 |
| 10 | 17 | 70.75 | 10 | 0.75 | 1.4 | 0.1 |
| 11 | 17 | 70.55 | 10 | 0.75 | 1.4 | 0.3 |
| 12 | 17 | 70.45 | 10 | 0.75 | 1.4 | 0.4 |

Polychloroprene Test Results. These tests were conducted according to military test procedure MMM-A-1617B.

| Test | Requirement under MMM-A-1617B | 8 | 9 | 10 | 11 | 12 |
|---|---|---|---|---|---|---|
| Aluminum to Duck | 15 | 3.5 | 18.3 | 16.7 | 7.1 | 13.3 |
| Aluminum to Neoprene | 15 | 22.5 | 25.2 | 29.4 | 25.1 | 24.3 |
| Immersion Aluminum to Duck In H₂0 | 12 | 1.4 | 22.8 | 9.8 | 6.5 | 13.3 |
| Immersion Aluminum to Duck In Oil | 12 | 3.6 | 13.3 | 10.7 | 11.4 | 10.6 |
| Bond Aging Aluminum to Duck | 15 | 4.257 | 12.0 | 14.5 | 9.0 | 12.6 |
| Accelerated Storage Aluminum to Duck | 12 | 16.6 | 3.6 | 14.2 | 19.2 | 12.1 |

Dead load testing was only done the polychloroprene formulations. Only Formulations 9 and 13 were tested. The other formulations made were to test the affect of different levels of water. The best one was used for this test.

TABLE 3

Dead Load Test (1 KG) Results for Type
II Polychloroprene at 60° C.

| Formulation | Distance pulled (in) |
|---|---|
| Formulation 9 | 0.5 |
| Formulation 13 | 0.2 |

Formulation 13 was composed of. Neoprene AF, 17.3%; MPK, 70.75%; Ribetak R7522, 9.7%; MgO, 1.4%; ZnO, 0.75%; and water, 0.1%.

Accelerated Storage peel test results are listed in the Table above. These tests were also conducted according to MMM-A-1617B.

The Table below exhibits additional formulations geared toward minimizing the dry time and yet still achieving good adhesion with the cellular insulation.

| | Wt % |
|---|---|
| Formulation 14 | |
| MPK | 58.13 |
| Ethyl Acetate | 19.38 |
| Ribetak R7522 | 7.69 |
| MgO | 1.08 |
| ZnO | 0.58 |
| H2O | 0.07 |
| Neoprene AF | 13.08 |
| | 100.00 |
| Tack Free Time | 9.5 min |
| Formulation 15 | |
| Ethyl Acetate | 77.50 |
| Ribetak R7522 | 7.69 |
| MgO | 1.08 |
| ZnO | 0.58 |
| H2O | 0.07 |
| Neoprene AF | 13.08 |
| | 100.00 |
| Tack Free Time | 2.9 min |
| Formulation 16 | |
| MPK | 19.38 |
| Ethyl Acetate | 58.13 |
| Ribetak R7522* | 7.69 |
| MgO | 1.08 |
| ZnO | 0.58 |
| H20 | 0.07 |
| Neoprene AF** | 13.08 |
| | 100.00 |
| **unmilled | |
| Flash Point | 93.4 F |
| Viscosity | 596 cP |
| Tack Free Time | 2 min. |
| Formulation 17 | |
| MPK | 19.38 |
| Ethyl Acetate | 58.13 |
| Ribetak R7522* | 7.69 |
| MgO | 1.08 |
| ZnO | 0.58 |
| H2O | 0.07 |
| Neoprene AC | 13.08 |
| | 100.00 |
| Viscosity | 896 cP |
| Tack Free Time | 2 min. |

| Dry Time (min) | % Cohesive |
|---|---|
| Formulation 14 | P.E. Foam |
| 5.00 | 0.00 |
| 7.00 | 25.00 |
| 9.00 | 30.00 |
| Formulation 18 | P.E. Foam |
| 3.00 | 0.00 |
| 6.00 | 15.00 |
| 9.00 | 15.00 |
| 12.00 | 20.00 |
| Formulation 14 | Nitrile Foam |
| 3.00 | 100.00 |
| 6.00 | 100.00 |
| 9.00 | 100.00 |
| 12.00 | 100.00 |
| Formulation 18 | Nitrile Foam |
| 3.00 | 100.00 |
| 6.00 | 100.00 |
| 9.00 | 100.00 |
| 12.00 | 100.00 |

*doubled the amount

In the table, Formulation 18 was formulated from: Neoprene AF, 13.08%; MPK, 19.38%; ethyl acetate, 58.12%; Ribetak R7522, 7.69%; MgO, 1.08%; ZnO, 0.58%; and water, 0.07%.

Below is a composition containing only non-HAP solvents and the subsequent test results on the United States Federal specification MMM-A-1617B. The range provided in this table is a preferred range for this particular formulation.

| SBR Rubber Cement | Formulation 19 wt % | Range wt % |
|---|---|---|
| Acetone | 31.50 | 23–40 |
| Heptane | 31.50 | 24–40 |
| Kraton D 1101 (SBR) | 20.00 | 13–27 |
| Picco 6115 (endblock resin) | 12.00 | 8–16 |
| Pentalyn H (midblock resin) | 5.00 | 2–10 |

In this formulation, endblock resin and midblock resins are added to compatibilize with the styrene endblock and butadiene midblock of the SBR. The endblock and midblock resins increase the hardness or modulus of the adhesive, and may modify the Tg of the midblock. The endblock resins are optional in the practice of this invention and when employed are used in conjunction with block copolymers such as styrene-butadiene-styrene and styrene-isoprene-styrene block copolymers. The midblock resins serve as tackifiers in the practice of this invention.

Test Results MMM-A-1617B for Formulation 19

| TEST | Requirement (lb./in) | Formulation 19 (lb./in) |
|---|---|---|
| Al to Duck | 12 | 11 |
| Al to polychloroprene | | |
| Al to Vinyl After Immersion | | |
| Al to Duck (water) | 6 | 11 |
| Al to Duck (oil) | | |
| Al to Duck (fuel) | | |

| TEST | Requirement (lb./in) | Formulation 19 (lb./in) |
|---|---|---|
| After Bond Aging | | |
| Al to Duck | 12 | 22 |
| After Accelerated Storage | | |
| Al to Duck | 10 | 15 |
| Dead Load | | |
| Viscosity (cP) | | 2105 |

Neoprene has been the popular term for polychloroprene elastomers. Neoprene is similar to natural rubber but has better aging and high temperature properties. The rate of strength development for neoprene contact adhesives is very rapid. Curing cements are commonly formulated with crosslinking agents, tackifiers, metal oxides, and antioxidants. These adhesives have excellent resistance to ozone exposure and oxidation. As solvent cement neoprene rubber cements are applied to both surfaces, the solvent is allowed to evaporate, and the prepared surfaces are mated and forced together under immediate pressure. The neoprene rubber cements are generally useful from −70 to +180° F. For structural applications neoprene is often blended with phenolics to promote mechanical strength and heat resistance. Good bonds are formed with a variety of metals including aluminum, steel, magnesium, and stainless steel. Neoprene is the principal adhesive used for installing kitchen countertops and is also widely used in the shoe industry. We have formulated a wide range of neoprene contact adhesives containing only non-HAP solvents that meet MMM-A-1617B. The range provided in this table is a preferred range for this particular formulation.

| Neoprene (polychloroprene rubber) Cement | Formulation 20 wt % | Range Wt. % |
|---|---|---|
| MPK | 16.335 | 10–25 |
| Ethyl Acetate | 53.585 | 45–65 |
| Ribetak 7522 (t-butyl phenolic resin) | 14.28 | 8–23 |
| Maglite D (MgO) | 1 | 0–2 |
| Kadox 911C (ZnO) | 0.538 | 0–2 |
| Water | 0.065 | 0–1 |
| Lowinox 22M46 | 0.5 | 0–3 |
| Neoprene AF | 13.697 | 9–18 |

Test Results MMM-A-1617B for Formulation 20

| TEST | Requirement lb. | Formulation 20 |
|---|---|---|
| Al to duck | 15.00 | 17.39 |
| Al to polychloroprene | 15.00 | >20 |
| Al to vinyl | | |
| After Immersion | | |
| Al to Duck (water) | 12.00 | 16.45 |
| Al to Duck (oil) | 12.00 | 14.98 |
| Al to Duck (fuel) | | |
| Bond Aging | | |
| Al to Duck | 15.00 | 17.40 |
| Accelerated storage | | |
| Al to duck | 12.00 | 37447.00 |
| Dead Load | 0.50 | 2 out of 3 passed |
| Viscosity (cP) | | 1600.00 |

Acrylonitrile butadiene or nitrile solvent cements are the most versatile type of rubber contact adhesive. However, they are less popular than Neoprene rubber cements. Nitrile adhesives are a copolymer of acrylonitrile and butadiene. The amount of acrylonitrile versus butadiene in the copolymer determines the adhesive characteristics. Nitrile adhesives have been formulated in a variety of viscosities using non-HAP solvents. These contact adhesives have very good resistance to oil and grease. Nitrile adhesives can also be used to bond both vulcanized and unvulcanized rubbers. The range provided in this table is a preferred range for this particular formulation.

| Nitrile Rubber Cement, No VOC No HAP, Highly Flammable | Formulation 21 wt % | Range Wt. % |
|---|---|---|
| Acetone | 64.35 | 40–80 |
| BKR 2620 (phenolic resin) | 17.95 | 8–25 |
| Nipol 1001 LG (High acrylonitrile butadiene rubber) | 17.70 | 8–23 |

Test Results MMM-A-1617B for Formulation 21

| TEST | Requirement (lb./in) | Formulation 21 (lb./in) |
|---|---|---|
| Al to Duck | 10 | 20 |
| Al to polychloroprene | | |
| Al to Vinyl | 8 | 8 |
| After Immersion | | |
| Al to Duck (water) | 5 | |
| Al to Duck (oil) | 8 | |
| Al to Duck (fuel) | 8 | |
| After Bond Aging | | |
| Al to Duck | 10 | 17 |
| After Accelerated Storage | | 1 |
| Al to Duck | 8 | 12 |
| Dead Load | | |
| Viscosity (cP) | | 5000 |

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as illustrative embodiments. Equivalent elements or materials may be substituted for those illustrated and described herein, and certain features of the invention may be utilized independently of the use of other features, all as would be apparent to one skilled in the art after having the benefit of this description of the invention.

What is claimed is:

1. A rubber cement composition, comprising a non-HAP aprotic, non-aromatic organic solvent; a tackifier; and a nitrile elastomer, wherein the composition does not contain a HAP solvent.

2. The rubber cement composition of claim 1, further comprising magnesium oxide, a derivative of the magnesium oxide, zinc oxide, or mixture thereof.

3. The rubber cement composition of claim 1, wherein the solvent is a ketone, an alkyl acetate, an alkane, an ether, or mixture thereof.

4. The rubber cement composition of claim 1, wherein the solvent is methyl propyl ketone, heptane, ethyl acetate, butyl acetate, and mixtures thereof.

5. The rubber cement composition of claim 1, wherein the elastomer is present in an amount of from about 5 to about 50 percent based on the total weight of the composition.

6. The rubber cement composition of claim 1, wherein the solvent is present in an amount of from about 10 to about 90 percent based on the total weight of the composition.

7. The rubber cement composition of claim 1, wherein the tackifier is present in an amount of from about 2 to about 30 percent based on the total weight of the composition.

8. The rubber cement composition of claim 1, wherein the tackifier is a phenolic resin.

9. The rubber cement composition of claim 1, wherein water is absent.

10. The rubber cement composition of claim 1, wherein the nitrile elastomer is present in an amount of from about 5 to about 30 percent based on the total weight of the composition.

11. The rubber cement composition of claim 1, wherein the solvent is present in an amount of from about 40 to about 80 percent based on the total weight of the composition.

12. The rubber cement composition of claim 1, wherein the tackifier is present in an amount of from about 5 to about 30 percent based on the total weight of the composition.

13. The rubber cement composition of claim 1 wherein the solvent is a ketone.

14. The rubber cement composition of claim 1 wherein the solvent is acetone.

15. A rubber cement composition, consisting essentially of about 40 to about 80 percent of a non-HAP aprotic, non-aromatic organic solvent; about 5 to about 30 percent of a tackifier; and about 5 to about 30 percent of a nitrile elastomer.

16. The rubber cement composition of claim 15, wherein the solvent is a ketone, an alkyl acetate, an alkane, an ether, or a mixture thereof.

17. The rubber cement composition of claim 15, wherein the solvent is acetone.

18. The rubber cement composition of claim 15, wherein the tackifier is a phenolic resin.

19. A rubber cement composition, consisting of at least one non-HAP aprotic, non-aromatic organic solvent; at least one tackifier; at least one nitrile elastomer; optionally an antioxidant; optionally a colorant; optionally a plasticizer; optionally a filler; optionally a flame retardant; and optionally a processing aid.

20. The rubber cement composition of claim 19, wherein the solvent is in an amount of from about 40 to about 80 percent.

21. The rubber cement composition of claim 20, wherein the nitrile elastomer is in an amount of from about 5 to about 30 percent.

22. The rubber cement composition of claim 21, wherein the tackifier is in an amount of from about 5 to about 30 percent.

23. The rubber cement composition of claim 22, wherein the solvent is a ketone.

24. The rubber cement composition of claim 22, wherein the solvent is acetone.

25. The rubber cement composition of claim 24, wherein the at least one tackifier is at least one phenolic resin.

* * * * *